United States Patent
Duan et al.

(10) Patent No.: US 9,315,420 B2
(45) Date of Patent: Apr. 19, 2016

(54) UV-SHIELDING MATERIAL BASED ON MG—AL LAYERED DOUBLE HYDROXIDE AND ITS APPLICATION IN ANTI-AGEING ASPHALT

(75) Inventors: Xue Duan, Beijing (CN); Wenying Shi, Beijing (CN); Min Wei, Beijing (CN); Yanjun Lin, Beijing (CN); Shaopeng Wu, Wuhan (CN); Jianying Yu, Wuhan (CN)

(73) Assignees: BEIJING UNIVERSITY OF CHEMICAL TECHNOLOGY, Beijing (CN); WUHAN UNIVERSTIY OF TECHNOLOGY, Wuhan (CN)

( * ) Notice: Subject to any disclaimer, the term of this patent is extended or adjusted under 35 U.S.C. 154(b) by 94 days.

(21) Appl. No.: 13/402,135

(22) Filed: Feb. 22, 2012

(65) Prior Publication Data
US 2012/0240821 A1  Sep. 27, 2012

(30) Foreign Application Priority Data

Mar. 21, 2011 (CN) .......................... 2011 1 0067535

(51) Int. Cl.

| | |
|---|---|
| *F21V 9/04* | (2006.01) |
| *F21V 9/06* | (2006.01) |
| *G02B 5/22* | (2006.01) |
| *G02B 5/26* | (2006.01) |
| *C04B 26/26* | (2006.01) |
| *C09D 101/00* | (2006.01) |

(Continued)

(52) U.S. Cl.
CPC ........... *C04B 26/26* (2013.01); *C04B 2103/605* (2013.01); *C04B 2111/0075* (2013.01)

(58) Field of Classification Search
USPC ................... 106/284.3, 273.1, 277; 252/589; 427/64, 419.1, 430.1; 548/402, 440; 208/44
See application file for complete search history.

(56) References Cited

U.S. PATENT DOCUMENTS 4,571,269 A * 2/1986 Finch et al. ................... 106/274

FOREIGN PATENT DOCUMENTS

| | | |
|---|---|---|
| CN | 1579937 A | 2/2005 |
| WO | WO 2004/080896 A1 * | 9/2004 .............. C01B 35/10 |

OTHER PUBLICATIONS

Jun Qin, Huan Zhang, Liping Chen and Jie Yu, The Structure and Properties of HDPE/EAA-Hydrotalcite Master Batch Nanocomposites, Advanced Materials Research Vals. 450-451 (2012) pp. 715-718, © (2012) Trans Tech Publications, Switzerland.*

(Continued)

*Primary Examiner* — Bijan Ahvazi
(74) *Attorney, Agent, or Firm* — Hamre, Schumann, Mueller & Larson P.C.

(57) ABSTRACT

The present invention relates to a preparation method for a UV-shielding material based on Mg—Al Layered Double Hydroxide. The material with multi-layered overlay structure is made from Mg—Al double hydroxide layers and interlayer carbonate, its molecular composition is: $Mg_{1-x}Al_x(OH)_2(CO_3)_{x/2} \cdot mH_2O$. The inorganic layers of this material can play a physical shielding role against UV, and the metal elements dispersed on the layer as well as the interlayer anion can play a great role in the chemical absorbing. In addition, by controlling the particle size and the amount of the layers, UV light can be effectively shielded by multi-level reflection and absorption of the multi-level layered structure. Therefore, the material with multi-level chemical and physical shielding properties has a good UV barrier effect for the anti-ageing asphalt, and could significantly increase its UV resistance properties.

4 Claims, 1 Drawing Sheet a b

(51) Int. Cl.
  *C09D 201/00* (2006.01)
  *C09D 4/00* (2006.01)
  *C10C 1/20* (2006.01)
  *C10C 3/02* (2006.01)
  *C04B 103/60* (2006.01)
  *C04B 111/00* (2006.01)

(56) References Cited

OTHER PUBLICATIONS

Wang et al; "Nano Mg—Al LDHS; Hydrothermal Synthesis and Microstructural Characterization", Chinese Journal of Inorganic Chemistry; vol. 23, No. 6, Jun. 2007; with English Abstract—5 pages.

* cited by examiner

UV-SHIELDING MATERIAL BASED ON MG—AL LAYERED DOUBLE HYDROXIDE AND ITS APPLICATION IN ANTI-AGEING ASPHALT

FIELD OF INVENTION

The present invention relates to the field of preparation technology of inorganic functional materials and anti-ageing asphalt technology, in particular, it relates to a UV-shielding material based on Mg—Al Layered Double Hydroxide and its application in improving the anti-ageing asphalt.

BACKGROUND

Asphalt as an important building material, has been widely used in the field of road construction, water-proof material and so on. However, it has a bad resistance to UV ageing, which easily lead to the destruction of the molecular structure, consequently cracks, ruts, pits, peeling and other problems for asphalt pavement, and seriously impact on the asphalt pavement performance, such as service life and road safety. Besides, asphalt waterproof material always is hardened under UV light, and difficult to adapt the low temperature in winter. In the end shrinkage and cracking of the roof was caused, resulting in the damage of the waterproof layer, and roof leaks. Therefore, it is urgent to improve the UV-ageing resistance properties of asphalt.

A variety of stabilizers used in the rubber, plastics and other polymer material didn't demonstrate obvious anti-ageing effect on asphalt. The reason contribute to the complex molecular structure of asphalt with thousands of organic compounds, and the different UV ageing mechanism compared with the general organic polymer material.

Reference (J. Xu, J. Yuan, C. Bao, J. Cheng, UV aging studies of the road asphalt and modified asphalt, Petroleum Asphalt, 2008, 22(6): 43-47) has reported the preparation of anti-UV ageing asphalt based on thermoplastic styrene-butadiene rubber (SBS). The results show that the SBS can largely improve the performance of asphalt, but the UV anti-ageing ability of the modified asphalt is the same as road asphalt, or even worse.

SUMMARY

To solve these problems in the existing technology, the present invention provides a UV-shielding material based on Mg—Al Layered Double Hydroxide (LDH) with its application in anti-ageing asphalt. The method described by this invention can control the synthesis of particle size and thickness of the layers, and the present invention was used in the preparation of anti-ageing asphalt by the synthetic Mg—Al Layered double Hydroxide material with UV-shielding properties.

The structure of the described UV-shielding material based on Mg—Al LDH with its application in anti-ageing asphalt is multi-level, and consisted by the layer and interlayer carbonate anion. UV-shielding material based on Mg—Al LDH is a kind of layered anionic clay with a hexagonal system, and the specific composition is: $Mg_{1-x}Al_x(OH)_2(CO_3)_{x/2} \cdot mH_2O$, wherein the x is the ration of the metal, $0.2 \leq x \leq 0.33$, m is the number of crystal water, and the range of which is 0~2.

The layer width of the described UV-shielding material based on Mg—Al LDH in the unit cell a, b-axis direction is 0.1~5 μm, preferably 0.05~1 μm; the particle thickness of the unit c-axis direction is 0.012~0.250 μm (10 to 200 layers), preferably 0.060~0.125 μm (50 to 100 layers).

The methods of preparing the UV-shielding material based on Mg—Al LDH with its application in anti-ageing asphalt are:

Method 1: The soluble magnesium and aluminum salt with molar ratio of $Mg^{2+}/Al^{3+}=2\sim4$ is dissolved in deionized water to form a mixed salt solution with $[Mg^{2+}]=0.1\sim2$ mol/L; NaOH and $Na_2CO_3$ are dissolved in deionized water to form a mixed alkali solution with $n(Na_2CO_3)/n(Al^{3+})=1\sim3$, $n(NaOH)/[n(Mg^{2+})+n(Al^{3+})]=1.8\sim2.5$, the volume of the mixed alkali solution is 0.5 to 2 times of mixed salt solution. $n(NaOH)$, $n(Mg^{2+})$, $n(Al^{3+})$, $n(Na_2CO_3)$ is the mole of NaOH, $Mg^{2+}$, $Al^{3+}$, $Na_2CO_3$. The mixed salt solution and mixed alkali solution are added into a rotating liquid film reactor to fast form the nuclear, and then the resulting slurry was crystallized by hydrothermal method at 80~200° C. for 0.1~72 h. The UV-shielding material based on Mg—Al LDH can be obtained after adequately washing and drying.

Method 2: After the $Mg^{2+}$ concentration of the mixed salt solution in the method 1 adjusted to 0.8~2 mol/L, a lot of small nuclei can be obtained by co-precipitation reaction in a short time. The template (octane and sodium dodecyl sulfate with mole ratio of is 0.5~2) was added to the slurry obtained method 1 with the 0.1-5% solid quality. The preparation condition is as same as method 1 besides crystallization time (0.1~48 h) and temp (80~130° C.). The resulting particle size of the UV-shielding material based on Mg—Al LDH is 0.1~2 μm in a, b direction, the thickness is 0.012~0.12 μm in c direction.

Method 3: After the $Mg^{2+}$ concentration of a mixed salt solution in the method 1 adjusted to 0.1~0.8 mol/L, a little number of nuclei and the larger particle size were obtained by co-precipitation reaction. The preparation condition is as same as method 1 besides crystallization time (12~72h) and temp (130~200° C.). The resulting particle size of the UV-shielding material based on Mg—Al LDH is 2~5 μm in a, b direction, and the thickness is 0.12~0.25 μm in c direction.

The organic surface modified of the UV-shielding material based on Mg—Al LDH has been carried out for above obtained three samples to increase the compatibility with the asphalt. The modifiers are carboxymethyl based cellulose, lignin sulfonate, olefin sulfonate, petroleum sulfonate, succinate sulfonate, silane coupling agent, titanate coupling agent or aluminum coupling agent, and preferably carboxymethyl cellulose, sodium lignin sulfonate or petroleum sulfonate; the modifier amount of the UV-shielding material based on Mg—Al LDH is 0.5~15%, preferably to 1~10%; the modification method is wet or dry method.

The UV-shielding material based on Mg—Al LDH or the organic surface modified UV-shielding material based on Mg—Al LDH was used to the preparation of the anti-ageing asphalt. The specific method is: the prepared UV-shielding material based on Mg—Al LDH (or surface organic modified UV-shielding material based on Mg—Al LDH) and the asphalt with the mass ratio of 0.01~0.1:1 were mixed and stir evenly at 150~180° C. The softening point of the anti-ageing asphalt is 40~50° C., and the penetration is more than 60 dmm under 25° C.

The performance of asphalt will be detected after irradiation the above samples at different times with UV light.

The UV-shielding material based on Mg—Al LDH fabricated in this invention is an anionic layered clay material with a hexagonal system. The material with multi-layered overlay structure is made from Mg—Al LDH and interlayer carbonate. The inorganic layers can play a physical shielding against UV and the metal elements on the layer can play a role in chemical absorption to UV, which provide a good barrier against UV effect. As we known, UV wavelength is about 0.2~0.4 μm, when the particle size in a, b-axis direction of unit cell equal to UV wavelength, the wave particle effect will appear. It will lead to the most intense UV scattering, which can significantly reduce the passing rate of UV. In addition, when the layers in the unit cell c-axis direction of the layers is greater than a certain value, UV light will be effectively shielded by multi-level reflection and absorption of the multi-level layered structure. When the layer is greater than 50 layers, the barrier to UV rate can reach 90%. This multi-level effect of chemical and physical shielding contributes to a good anti-UV effect for the material. Therefore, this material is a kind of excellent performance anti-UV material, and can significantly improve the performance of UV ageing and prolong the service life of asphalt.

DETAILED DESCRIPTION OF THE EMBODIMENTS

Figure 1:
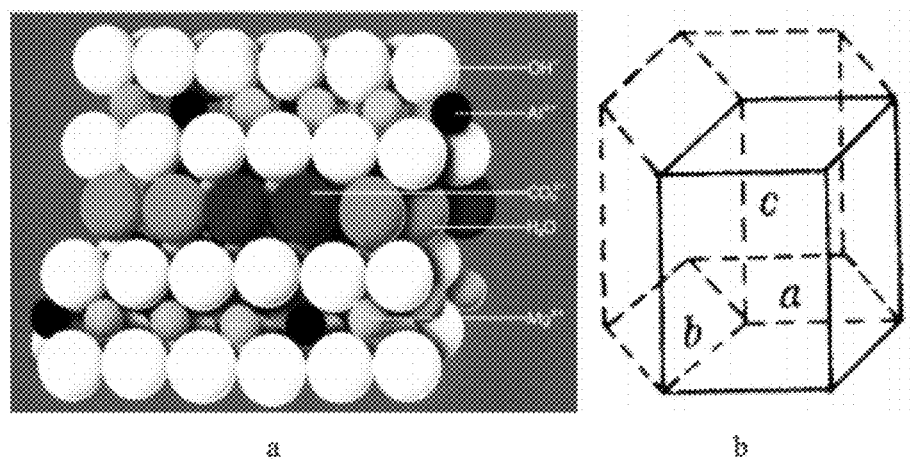
FIG. 1 is the structure (a) and the unit cell diagram (b) of UV-shielding material based on Mg—Al LDH.
Figure 2:
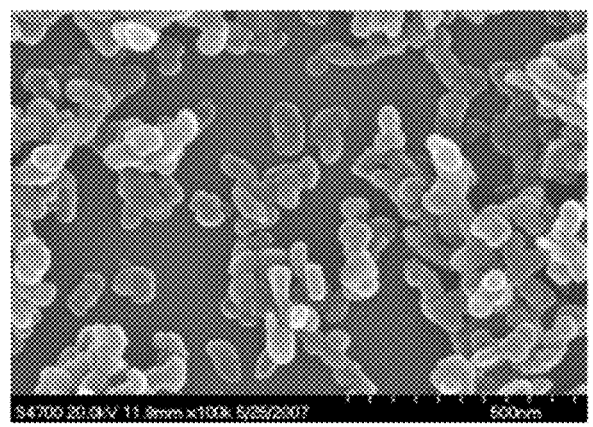
FIG. 2 is TEM image of UV-shielding material based on Mg—Al LDH.
Figure 3:
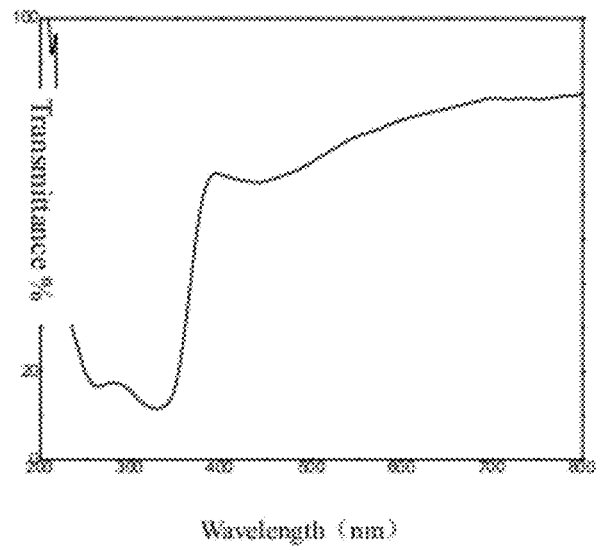
FIG. 3 is UV-visible absorption spectra of UV-shielding material based on Mg—Al LDH.

The present invention will be further explained through following examples. However, the contents of the present invention are not limited to the following embodiments.

Example 1

The $MgCl_2$ and $AlCl_3$ (the mole ratio is 2) were dissolved in deionized water with $[Mg^{2+}]$=1.5 mol/L. The NaOH ($n(NaOH)/[n(Mg^{2+})+n(Al^{3+})]$=2.1) and $Na_2CO_3$ ($n(Na_2CO_3)/n(Al^{3+})$=2) were dissolved in the deionized water. The above two solutions were added at the same time into rotating liquid film reactor. The template octane and sodium dodecyl sulfate (the mole ratio is 1) were added into the resulting slurry with 0.5% mass of the solid slurry. It was stirred in the flask at 80° C. for 1 h and then adequately washed, modified by 2% sodium carboxymethyl cellulose and dried. The resulting sample is UV-shielding material based on Mg—Al LDH. The specific composition is $Mg_{0.67}Al_{0.33}(OH)_2(CO_3)_{0.17} \cdot 0.6H_2O$. The particle size of the material is about 0.2 μm in a, b direction and 0.06 μm in the c-axis direction, and the number of layers is about 50. The rate of the UV-shielding is 90.5% obtained by UV-visible absorption spectrum.

The anti-ageing asphalt is prepared by putting 1 g of the UV-shielding material based on Mg—Al LDH into the asphalt (100 g 150° C.) and thorough stirring. The UV-ageing experiment of the anti-ageing asphalt is carried out in the UV boxing with 1200 μw/cm² UV intensity for 6 days. The viscosity of the anti-ageing asphalt with UV-shielding material based on Mg—Al LDH at 60° C. increased by 260 Pa·s (from 260 to 520 Pa·s). The viscosity of asphalt without UV-shielding material based on Mg—Al LDH increased by 342 Pa·s (from 254 to 596 Pa·s). The results show the viscosity increment of anti-ageing asphalt with UV-shielding material based on Mg—Al LDH is lower than that of asphalt without UV-shielding material based on Mg—Al LDH. Therefore, the anti-ageing asphalt with UV-shielding material based on Mg—Al LDH exhibits more excellent resistance to UV ageing.

Example 2

The $MgSO_4$ and $Al_2(SO_4)_3$ (the mole ratio is 3) were dissolved in deionized water with $[Mg^{2+}]$=1.9 mol/L. The NaOH ($n(NaOH)/[n(Mg^{2+})+n(Al^{3+})]$=2.4) and $Na_2CO_3$ ($n(Na_2CO_3)/n(Al^{3+})$=3) were dissolved in the deionized water. The above two solutions were added at the same time into rotating liquid film reactor. The template octane and sodium dodecyl sulfate (the mole ratio is 1.5) were added into the resulting slurry with 3% mass of the solid slurry. It was stirred in the flask at 100° C. for 10 h and then adequately washed, modified by 5% sodium carboxymethyl cellulose and dried. The resulting sample is UV-shielding material based on Mg—Al LDH. The specific composition is $Mg_{0.75}Al_{0.25}(OH)_2(CO_3)_{0.12} \cdot 1.2H_2O$. The particle size of UV-shielding material based on Mg—Al LDH is about 0.4 μm in a, b direction and 0.1 μm in the c-axis direction, and the number of layers is about 80.

The anti-ageing asphalt is prepared by putting 3 g of the UV-shielding material based on Mg—Al LDH into the asphalt (100 g 150° C.) and thorough stirring. The UV-ageing experiment of the anti-ageing asphalt is carried out in the UV boxing with 1200 μw/cm² UV intensity for 6 days. The viscosity of the anti-ageing asphalt with UV-shielding material based on Mg—Al LDH at 60° C. increased by 219 Pa·s (from 288 to 507 Pa·s). The viscosity of asphalt without UV-shielding material based on Mg—Al LDH increased by 342 Pa·s (from 254 to 596 Pa·s). Similar to Sample 1, the anti-ageing asphalt with UV-shielding material based on Mg—Al LDH exhibits more excellent resistance to UV ageing.

Example 3

The $Mg(NO_3)_2$ and $Al(NO_3)_3$ (the mole ratio is 4) were dissolved in deionized water with $[Mg^{2+}]$=1.0 mol/L. The NaOH ($n(NaOH)/[n(Mg^{2+})+n(Al^{3+})]$=0.9) and $Na_2CO_3$ ($n(Na_2CO_3)/n(Al^{3+})$=1.5) were dissolved in the deionized water. The above two solutions were added at the same time into rotating liquid film reactor. The template octane and sodium dodecyl sulfate (the mole ratio is 1.0) were added into the resulting slurry with 4.5% mass of the solid slurry. It was stirred in the autoclave at 130° C. for 40 h and then adequately washed, modified by 5% petroleum sulfonate and dried. The resulting sample is UV-shielding material based on Mg—Al LDH. The specific composition is $Mg_{0.8}Al_{0.2}(OH)_2(CO_3)_{0.1} \cdot 1.8H_2O$. The particle size of LDH is about 1.8 μm in a, b direction and 0.12 μm in the c-axis direction, and the number of layers is about 100.

The anti-ageing asphalt is prepared by putting 5 g of the UV-shielding material based on Mg—Al LDH into the asphalt (100 g 150° C.) and thorough stirring. The UV-ageing experiment of the anti-ageing asphalt is carried out in the UV boxing with 1200 μw/cm² UV intensity for 6 days. The viscosity of the anti-ageing asphalt with UV-shielding material based on Mg—Al LDH at 60° C. increased by 214 Pa·s (from 331 to 545 Pa·s). The viscosity of asphalt without UV-shielding material based on Mg—Al LDH increased by 342 Pa·s (from 254 to 596 Pa·s). Similar to Sample 1, the anti-ageing asphalt with UV-shielding material based on Mg—Al LDH exhibits more excellent resistance to UV ageing.

Example 4

The $MgSO_4$ and $Al_2(SO_4)_3$ (the mole ratio is 3) were dissolved in deionized water with $[Mg^{2+}]$=0.2 mol/L. The NaOH ($n(NaOH)/[n(Mg^{2+})+n(Al^{3+})]$=2.0) and $Na_2CO_3$ ($n(Na_2CO_3)/n(Al^{3+})$=2.5) were dissolved in the deionized water. The above two solutions were added at the same time into rotating liquid film reactor. The template octane and sodium dodecyl sulfate (the mole ratio is 1) were added into the resulting slurry with 0.5% mass of the solid slurry. It was stirred in the autoclave at 140° C. for 15 h and then adequately washed, modified by 10% Silane coupling and dried. The resulting sample is UV-shielding material based on Mg—Al LDH. The specific composition is $Mg_{0.75}Al_{0.25}(OH)_2(CO_3)_{0.12}\cdot 1.2H_2O$. The particle size of UV-shielding material based on Mg—Al LDH is about 2.1 μm in a, b direction and 0.13 μm in the c-axis direction, and the number of layers is about 110.

The anti-ageing asphalt is prepared by putting 9 g of the UV-shielding material based on Mg—Al LDH into the asphalt (100 g 150° C.) and thorough stirring. The UV-ageing experiment of the anti-ageing asphalt is carried out in the UV boxing with 1200 μw/cm² UV intensity for 6 days. The viscosity of the anti-ageing asphalt with UV-shielding material based on Mg—Al LDH at 60° C. increased by 201 Pa·s (from 349 to 550 Pa·s). The viscosity of asphalt without UV-shielding material based on Mg—Al LDH increased by 342 Pa·s (from 254 to 596 Pa·s). The results show the viscosity increment of anti-ageing asphalt with UV-shielding material based on Mg—Al LDH is lower than that of asphalt without UV-shielding material based on Mg—Al LDH. Therefore, the anti-ageing asphalt with UV-shielding material based on Mg—Al LDH exhibits more excellent resistance to UV ageing.

Example 5

The $MgCl_2$ and $AlCl_3$ (the mole ratio is 2) were dissolved in deionized water with $[Mg^{2+}]=0.5$ mol/L. The NaOH ($n(NaOH)/[n(Mg^{2+})+n(Al^{3+})]=2.5$) and $Na_2CO_3$ ($n(Na_2CO_3)/n(Al^{3+})=1.5$) were dissolved in the deionized water. The above two solutions were added at the same time into rotating liquid film reactor. The template octane and sodium dodecyl sulfate (the mole ratio is 1) were added into the resulting slurry with 0.5% mass of the solid slurry. It was stirred in the autoclave at 160° C. for 50 h and then adequately washed, modified by 13% titanate coupling agent and dried. The resulting sample is UV-shielding material based on Mg—Al LDH. The specific composition is $Mg_{0.67}Al_{0.33}(OH)_2(CO_3)_{0.17}\cdot 0.6H_2O$. The particle size of UV-shielding material based on Mg—Al LDH is about 2.9 μm in a, b direction and 0.18 μm in the c-axis direction, and the number of layers is about 150.

The anti-ageing asphalt is prepared by putting 2 g of the UV-shielding material based on Mg—Al LDH into the asphalt (100 g 150° C.) and thorough stirring. The UV-ageing experiment of the anti-ageing asphalt is carried out in the UV boxing with 1200 mw/cm² UV intensity for 6 days. The viscosity of the anti-ageing asphalt with UV-shielding material based on Mg—Al LDH at 60° C. increased by 291 Pa·s (from 276 to 567 Pa·s). The viscosity of asphalt without UV-shielding material based on Mg—Al LDH increased by 342 Pa·s (from 254 to 596 Pa·s). Similar to Sample 1, the anti-ageing asphalt with UV-shielding material based on Mg—Al LDH exhibits more excellent resistance to UV ageing.

Example 6

The $Mg(NO_3)_2$ and $Al(NO_3)_3$, (the mole ratio is 4) were dissolved in deionized water with $[Mg^{2+}]=0.8$ mol/L. The NaOH ($n(NaOH)/[n(Mg^{2+})+n(Al^{3+})]=1.9$) and $Na_2CO_3$ ($n(Na_2CO_3)/n(Al^{3+})=2.6$) were dissolved in the deionized water. The above two solutions were added at the same time into rotating liquid film reactor. The template octane and sodium dodecyl sulfate (the mole ratio is 1) were added into the resulting slurry with 0.5% mass of the solid slurry. It was stirred in the autoclave at 190° C. for 70 h and then adequately washed, modified by 6% Petroleum sulfonate and dried. The resulting sample is UV-shielding material based on Mg—Al LDH. The specific composition is $Mg_{0.8}Al_{0.2}(OH)_2(CO_3)_{0.1}\cdot 1.8H_2O$. The particle size of UV-shielding material based on Mg—Al LDH is about 4.5 μm in a, b direction and 0.228 μm in the c-axis direction, and the number of layers is about 190.

The anti-ageing asphalt is prepared by putting 6 g of the UV-shielding material based on Mg—Al LDH into the asphalt (100 g 150° C.) and thorough stirring. The UV-ageing experiment of the anti-ageing asphalt is carried out in the UV boxing with 1200 mw/cm² UV intensity for 6 days. The viscosity of the anti-ageing asphalt with UV-shielding material based on Mg—Al LDH at 60° C. increased by 230 Pa·s (from 331 to 570 Pa·s). The viscosity of asphalt without UV-shielding material based on Mg—Al LDH increased by 342 Pa·s (from 254 to 596 Pa·s). Similar to Sample 1, the anti-ageing asphalt with UV-shielding material based on Mg—Al LDH exhibits more excellent resistance to UV ageing.

The invention claimed is:

1. A UV-shielding material based on Mg—Al Layered Double Hydroxide (LDH) and its application in improving anti-UV ageing of asphalt, the UV-shielding material based on Mg—Al LDH having a multi-level structure, and comprising:
    layer and interlayer carbonate anion that is a layered anionic clay with a hexagonal system,
    a composition of the UV-shielding material comprising:
        $Mg_{1-x}Al_x(OH)_2(CO_3)_{x/2}\cdot mH_2O$, wherein x is a ratio of metal, $0.2 \leq x \leq 0.33$, m is a number of crystal water in a range of $0 \leq m \leq 2$;
        a particle size of the UV-shielding material based on Mg—Al LDH in a, b-axis direction in the unit cell is 0.05-5 μm and in c-axis direction is 0.06-0.250 μm,
        the UV-shielding material based on Mg—Al LDH comprising 10 to 200 layers;
        the UV-shielding material based on Mg—Al LDH being organic-surface modified to increase a compatibility with the asphalt, wherein a modifier is carboxymethyl based cellulose, lignin sulfonate, olefin sulfonate, petroleum sulfonate, succinate sulfonate, silane coupling agent, titanate coupling agent, or aluminum coupling agent; and a modification method is wet or dry method; and
    the organic surface modified UV-shielding material based on Mg—Al LDH used for a preparation of the anti-ageing asphalt including:
        the organic surface modified UV-shielding material based on Mg—Al LDH mixed with asphalt with a mass ratio of the organic surface modified UV-shielding material based on Mg—Al LDH:asphalt=0.01-0.1:1, and wherein a softening point of the anti-ageing asphalt is 40-50° C. and a penetration is more than 60 dmm under 25° C. after having been stirred evenly at 150-180° C.;
    wherein the UV-shielding material based on Mg—Al LDH prepared by a process comprising:
        dissolving soluble magnesium and aluminum with a mole ratio of magnesium:aluminum=2-4 in deionized water to obtain a mixed salt solution with $[Mg^{2+}]=0.1-2$ mol/L;

dissolving NaOH and $Na_2CO_3$ in deionized water to obtain a mixed alkali solution with $n(NaOH)/[n(Mg^{2+})+n(Al^{3+})]=1.8$-$2.5$ and $n(Na_2CO_3)/n(Al^{3+})=1$-$3$, wherein a volume of the mixed alkali solution is 0.5 to 2 times of the mixed salt solution, and n(NaOH), $n(Mg^{2+})$, $n(Al^{3+})$, $n(Na_2CO_3)$ is the mole of NaOH, $Mg^{2+}$, $Al^{3+}$, $Na_2CO_3$;

adding the mixed alkali solution and the mixed salt solution into a rotating liquid film reactor to obtain a slurry;

adding a template octane and a sodium dodecyl sulfate with a mole ratio of octane:sodium dodecyl sulfate=0.5-2 into the slurry with 0.1-5% mass of a solid slurry;

stirring the slurry in a flask at 80-130° C. for 0.1-48 h and then washing and drying the slurry to obtain the UV-shielding material based on Mg—Al LDH, or the UV-shielding material based on Mg—Al LDH prepared by a process comprising:

dissolving a soluble magnesium and aluminum with a mole ratio of magnesium:aluminum=2-4 in deionized water to obtain a mixed salt solution with $[Mg^{2+}]=0.1$-$0.8$ mol/L;

dissolving NaOH and $Na_2CO_3$ in deionized water to obtain a mixed alkali solution with $n(NaOH)/[n(Mg^{2+})+n(Al^{3+})]=1.8$-$2.5$ and $n(Na_2CO_3)/n(Al^{3+})=1$-$3$, wherein the volume of the mixed alkali solution is 0.5 to 2 times of the mixed salt solution, and n(NaOH), $n(Mg^{2+})$, $n(Al^{3+})$, $n(Na_2CO_3)$ is the mole of NaOH, $Mg^{2+}$, $Al^{3+}$, $Na_2CO_3$;

adding the mixed salt solution and the mixed alkali solution into a rotating liquid film reactor to obtain a slurry;

stirring the slurry in a flask at 130-200° C. for 12-72 h and then washing and drying the slurry to obtain the UV-shielding material based on Mg—Al LDH.

2. The UV-shielding material according to claim 1, wherein the particle size of the UV-shielding material based on Mg—Al LDH in the a, b-axis direction is 0.05-1 μm.

3. The UV-shielding material according to claim 1, wherein the particle size in the c-axis direction is 0.060-0.125 μm, the UV-shielding material based on Mg—Al LDH comprising 50 to 100 layers.

4. The UV-shielding material according to claim 1, wherein the modifier is carboxymethyl cellulose, sodium lignin sulfonate, or petroleum sulfonate.

\* \* \* \* \*